United States Patent
Zheng et al.

(10) Patent No.: US 12,359,038 B2
(45) Date of Patent: Jul. 15, 2025

(54) HIGHLY THERMALLY CONDUCTIVE FLOWABLE SILICONE COMPOSITION

(71) Applicant: Dow Silicones Corporation, Midland, MI (US)

(72) Inventors: Yan Zheng, Shanghai (CN); Chen Chen, Shanghai (CN); Dorab Bhagwagar, Auburn, MI (US); Peng Wei, Shanghai (CN); Qianqing Ge, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 540 days.

(21) Appl. No.: 17/761,360

(22) PCT Filed: Dec. 5, 2019

(86) PCT No.: PCT/CN2019/123175
§ 371 (c)(1),
(2) Date: Mar. 17, 2022

(87) PCT Pub. No.: WO2021/109051
PCT Pub. Date: Jun. 10, 2021

(65) Prior Publication Data
US 2022/0289936 A1  Sep. 15, 2022

(51) Int. Cl.
C08K 3/22 (2006.01)
C08G 77/04 (2006.01)
C08K 3/28 (2006.01)

(52) U.S. Cl.
CPC .............. *C08K 3/22* (2013.01); *C08G 77/04* (2013.01); *C08K 3/28* (2013.01); *C08K 2003/2227* (2013.01); *C08K 2003/282* (2013.01); *C08K 2201/001* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 5,009,957 A * | 4/1991 | Lee | C08K 9/10 528/901 |
| 6,284,829 B1 | 9/2001 | Dalbe et al. | |
| 7,789,330 B2 | 9/2010 | Miyazawa et al. | |
| 10,683,444 B2 | 6/2020 | Takanashi et al. | |
| 2010/0130673 A1 | 5/2010 | Ito et al. | |
| 2018/0127629 A1* | 5/2018 | Takanashi | C08K 5/5415 |
| 2018/0134938 A1 | 5/2018 | Hirakawa et al. | |
| 2019/0256756 A1* | 8/2019 | Ishihara | C08K 13/04 |
| 2020/0140736 A1 | 5/2020 | Takenaka et al. | |

FOREIGN PATENT DOCUMENTS

| | | |
|---|---|---|
| CN | 101054507 | 10/2007 |
| CN | 107892898 | 4/2018 |
| CN | 110330946 | 10/2019 |
| EP | 3530702 | 8/2019 |
| JP | 2011122000 | 6/2011 |
| JP | 2012020900 | 2/2012 |
| JP | 2013147600 | 8/2013 |
| WO | 2020133374 | 7/2020 |

OTHER PUBLICATIONS

Search Report from corresponding European U.S. Appl. No. 19/954,848 dated Jul. 17, 2023.

* cited by examiner

*Primary Examiner* — Robert T Butcher
(74) *Attorney, Agent, or Firm* — Steven W. Mork

(57) ABSTRACT

A composition contains: (a) a polyorganosiloxane component comprising one or a combination of more than one poly-organosiloxane; (b) a filler treating agent comprising alkyltrialkoxysilane and trialkoxysiloxy-terminated diorganopolysiloxane; (c) 90-98 weight-percent of a combination of thermally conductive fillers comprising: (i) 25-40 weight-percent of thermally conductive filler particles having an average particle size of 70-150 micrometers and selected from one or a combination of aluminum oxide and aluminum nitride particles; (ii) 15-30 weight-percent thermally conductive filler particles having an average particle size in a range of 30-45 micrometers selected from one or a combination of aluminum oxide and aluminum nitride particles; (iii) 25-32 weight-percent aluminum oxide particles having an average particle size in a range of 1-5 micrometers; and (iv) 10-15 weight-percent thermally conductive filler particles having an average particle size in a range of 0.1 to 0.5 micrometers; where weight-percent is relative to composition weight.

10 Claims, No Drawings

HIGHLY THERMALLY CONDUCTIVE FLOWABLE SILICONE COMPOSITION

BACKGROUND OF THE INVENTION

Field of the Invention

The present invention relates to a thermally conductive composition that contains a combination of four different sized filler particles.

Introduction

There is an ever increasing performance demand on electronic devices that requires electronic circuitry handle ever increasing power density demands. As a result, heat dissipation requirements for the circuitry is also increasing to remove heat generated by the increased power density.

Thermally conductive materials used to dissipate heat between circuit elements are often polyorganosiloxane matrices highly filled with thermally conductive fillers. The thermally conductive material is interposed between elements of a circuit to conduct heat from one element to another in an effort to dissipate the heat in the circuit. Increasing the concentration of thermally conductive fillers increases the thermal conductivity of the thermally conductive material, but it also increases the viscosity of the material. There is a challenge in obtaining the highest possible thermal conductivity while still maintaining a sufficiently low viscosity (extrudability) so as to be able to process and apply the material effectively. It is a particular target for the present invention to identify a thermally conductive material that has a thermal conductivity of greater than 7.5 Watts per meter*Kelvin (W/m*K) and a good processability as defined by having an extrusion rate of 50 grams per minute as determined by the Extrusion Rate Test set forth hereinbelow.

Patent application PCT/CN2018/125408 discloses a thermally conductive material with a polyorganosiloxane matrix that contains a specific distribution of three thermally conductive fillers one of which is a large magnesium oxide (MgO) filler particle. One example in this reference, INV-7, demonstrates a thermally conductive material containing 129 micrometer magnesium oxide (MgO) particles that is able to achieve a thermal conductivity greater than 7.5 W/m*K and a flow rate of more than 50 g/min.

US20180127629 discloses thermally conductive materials with a polyorganosiloxane material that contain a specific distribution of thermally conductive fillers. Two of the examples in this reference (Examples 3 and 4) demonstrate a thermal conductivity above 7.5 W/m*K. It is unclear what the extrusion rate of the materials are. Examples 1-10 of this reference use a surface treatment agent that is a specific vinyl functional siloxane molecule and the results of these examples demonstrate that a thermal conductivity above 7.5 W/m*K is only achieved at a loading of 1.0 parts of this treatment agent and going above or below this loading level results in a thermal conductivity below 7.5 W/m*K. These results reveal that the target thermal conductivity is only achieved at a specific loading of a specific surface treatment agent. It is desirable to identify a polyorganosiloxane-based thermally conductive material that can achieve a thermal conductivity of greater than 7.5 W/m*K and a flow rate of greater than 50 g/min as determined by the Extrusion Rate Test without requiring 129 micrometer MgO particles as required in PCT/CN2018/125408 or the specific vinyl functional surface treatment agent at a specific concentration as is required in US20180127629. Even more desirable is such a thermally conductive material that can achieve a thermal conductivity of 8.0 W/m*K or more, or even 9.0 W/m*K or more, which is not achieved in either of these references.

BRIEF SUMMARY OF THE INVENTION

The present invention provides a solution to the problem of discovering a polyorganosiloxane-based thermally conductive material that can achieve a thermal conductivity of greater than 7.5 W/m*K and a flow rate of greater than 50 g/min as determined by the Extrusion Rate Test without requiring 129 micrometer MgO particles, or any MgO particles, as required in PCT/CN2018/125408 or the specific vinyl functional surface treatment agent at a specific concentration as is required in US20180127629. The present invention can even achieve a thermally conductivity of 8.0 W/m*K or more, or even 9.0 W/m*K or more.

The present invention is a result of discovering a specific combination of thermally conductive fillers and surface treatment agents that together serve to achieve an unexpectedly high thermal conductivity while also achieving the target flowability.

In a first aspect, the present invention is a composition comprising: (a) a polyorganosiloxane component comprising one or a combination of more than one polyorganosiloxane; (b) a filler treating agent comprising alkyltrialkoxysilane and trialkoxysiloxy-terminated diorganopolysiloxane; (c) 90-98 weight-percent of a combination of thermally conductive fillers comprising: (i) 25-40 weight-percent of thermally conductive filler particles having an average particle size of 70-150 micrometers and selected from one or a combination of aluminum oxide and aluminum nitride particles; (ii) 15-30 weight-percent thermally conductive filler particles having an average particle size in a range of 30-45 micrometers selected from one or a combination of aluminum oxide and aluminum nitride particles; (iii) 25-32 weight-percent aluminum oxide particles having an average particle size in a range of 1-5 micrometers; and (iv) 10-15 weight-percent thermally conductive filler particles having an average particle size in a range of 0.1 to 0.5 micrometers; where weight-percent is relative to composition weight In a second aspect, the present invention is an article of manufacture comprising the composition of the first aspect interposed along a thermal path between two objects.

The present invention is useful as a thermally conductive material in electronic circuits for assisting in dissipating heat.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume. Determine viscosity according to ASTM D-445, IP 71, using a viscosity glass capillary (CTM0004 A). Determine the kinematic viscosity of a liquid sample by measuring the time required for a fixed volume of sample liquid to pass through the calibrated class capillary using gravity flow.

The composition of the present invention comprises a polyorganosiloxane component comprising one or a combination of more than one polyorganosiloxane. The polyorganosiloxane component, in the broadest scope of the invention, can comprise any polyorganosiloxane. Desirably, the polyorganosiloxane component comprises a polyorganosiloxane with one or more than one carbon-carbon unsaturated bond, preferably a carbon-carbon double bound, more preferably a carbon-carbon double bond in the form of a vinyl group. Additionally, it is desirably for the polyorganosiloxane component to have a polyorganosiloxane that contains a silyl hydride functionality (Si—H), preferably multiple silyl hydride functionalities per molecule. The carbon-carbon unsaturated group and/or the silyl hydride group can be located in a pendant or terminal position along a polyorganosiloxane chain. The polyorganosiloxane containing a carbon-carbon unsaturated bond and the polyorganosiloxane containing the silyl hydride functionality can be the same polyorganosiloxane or can be different polyorganosiloxanes. When the polyorganosiloxane component comprises polyorganosiloxanes with carbon-carbon unsaturated bonds and silyl hydride functionalities the polyorganosiloxane component can undergo a hydrosilylation reaction to build viscosity, crosslink, gel, or cure to a hard composition when desired. The polyorganosiloxane component can additionally or alternatively comprise one or more than one polyorganosiloxane having one or more than one silyl alkoxide groups (Si—OR), where "R" corresponds to a hydrocarbyl group, which, as used herein, includes substituted hydrocarbyl groups, which are hydrocarbyl groups with one or more than one carbon and/or hydrogen is replaced with another atom or chemical moiety such as fluorine, oxygen, hydroxyl or alkoxy).

Examples of desirable polyorganosiloxanes having carbon-carbon unsaturated bonds include vinyl capped polydiorganosiloxanes such as those having the following general Formula (I):

where "Vi" corresponds to a vinyl group (—CH=CH$_2$), R is independently in each occurrence selected from hydrocarbyl groups having from one to 12 carbons, and subscript "a" corresponds to the average number of ((CH$_3$)$_2$)SiO) siloxane units per molecule. The hydrocarbyl group can be a substituted hydrocarbyl. Desirably, the hydrocarbyl group is selected from methyl and phenyl groups and is preferably a methyl group. Subscript "a" is desirably a value of 5 or more, 10 or more, 15 or more, 20 or more, 25 or more, 30 or more, 35 or more, 40 or more, 45 or more, 50 or more, even 55 or more while at the same time is generally 100 or less, 95 or less, 90 or less, 85 or less, 80 or less, 75 or less, 70 or less, 65 or less, even 60 or less. Determine subscript values such as "a" (also subscripts "b", "c" "d", "e", "f" and "g" as used in formulations below) using $^{29}$Si, $^{13}$C and $^1$H nuclear magnetic resonance spectroscopy.

Examples of desirable polyorganosiloxanes having silyl hydride functionality include polydimethyl siloxane molecules where some of the methyl groups are replaced with hydrogen atoms. Suitable examples include those having the following general Formula (II):

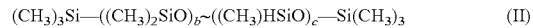

where subscript "b" indicates the average number of ((CH$_3$)$_2$SiO) siloxane units per molecule and subscript "c" indicate the average number of ((CH$_3$)HSiO) siloxane units per molecule. The "~" indicates that the (CH$_3$)$_2$SiO) and ((CH$_3$)HSiO) groups can be in blocks or randomly distributed in any groupings provided that the total number of (CH$_3$)$_2$SiO) groups is b and the total number of ((CH$_3$)HSiO) groups is c. Subscript "b" is desirably a value of 5 or more, 7 or more, 10 or more, 15 or more, even 20 or more while at the same time is typically 50 or less, 45 or less, 40 or less, 35 or less, 30 or less, 25 or less, 20 or less, 15 or less or even 10 or less. Subscript "c" is desirably a value of one or more, 2 or more, 3 or more, 4 or more, even 5 or more and at the same time is typically 10 or less, 9 or less, 8 or less, 7 or less, 6 or less, 5 or less, 4 or less even 3 or less.

In general, it is desirable for the composition to have 4.0 weight-percent (wt %) or less, preferably 3.75 wt % or less, or even 3.5 wt % or less while at the same time 2.5 wt % or more, preferably 2.75 wt % or more, 2.9 wt % or more or even 3.0 wt % or more polyorganosiloxane component relative to composition weight.

The composition can comprise polyorganosiloxanes with carbon-carbon unsaturated bonds, preferably vinyl capped polydimethylsiloxanes, at a concentration of 2.0 wt % or more, 2.1 wt % or more, 2.2 wt % or more, 2.3 wt % or more, 2.4 wt % or more, 2.5 wt % or more, 2.6 wt % or more, 2.7 wt % or more, even 2.9 wt % or more while at the same time 3.0 wt % or less, 2.9 wt % or less, 2.8 wt % or less, 2.6 wt % or less, 2.5 wt % or less, even 2.4 wt % or less based on compositions weight in combination with one or two polydimethyl siloxane molecules present at a concentration (combined concentration if more than one) of 0.47 wt % or more, 0.48 wt % or more, 0.49 wt % or more, 0.50 wt % or more, 0.51 wt % or more, 0.52 wt % or more, 0.53 wt % or more, 0.54 wt % or more, 0.55 wt % or more, 0.56 wt % or more, 0.57 wt % or more, 0.58 wt % or more, even 0.59 wt % or more while at the same time 0.62 wt % or less, 0.61 wt % or less, 0.60 wt % or less, 0.59 wt % or less, 0.58 wt % or less, 0.57 wt % or less, 0.56 wt % or less, 0.55 wt % or less, 0.54 wt % or less, 0.53 wt % or less or even 0.52 wt % or less relative to composition weight.

The composition of the present invention includes a filler treating agent comprising both alkyltrialkoxysilane and trialkoxysiloxy-terminated diorganopolysiloxane.

The alkyltrialkoxysilane is of the general formula: (R')(R"O)$_3$Si; where R' is an alkyl desirably having 6 or more, 7 or more, 8 or more, 9 or more, 10 or more, 11 or more, 12 or more, 13 or more, 14 or more, 15 or more, even 16 or more carbon atoms while at the same time typically has 18 or fewer and can have 17 or fewer, 16 or fewer, 15 or fewer, 14 or fewer, 13 or fewer, 12 or fewer, 11 or fewer or even 10 or fewer carbon atoms on average per molecule; and R" is desirably an alkyl having one or more, 2 or more, 3 or more, 4 or more, 5 or more, even 6 or more while at the same time typically contains 10 or fewer, 9 or fewer, 8 or fewer, 7 or fewer, 6 or fewer, 5 or fewer, 4 or fewer, 3 or fewer, even 2 or fewer carbon atoms. Desirably, the alkyltrialkoxysilane is an alkyltrimethoxy silane with the alkyl group as described above. One example of a desirably alkyl trialkoxy silane is decyltrimethoxy silane. The concentration of alkyltrialkoxysilane is generally 0.20 wt % or more, 0.22 wt % or more, 0.24 wt % or more while at the same time 0.30 wt % or less, preferably 0.28 wt % or less, 0.26 wt % or less 0.24 wt % or less and can be 0.22 wt % or less based on the composition weight.

The trialkoxysiloxy-terminated diorganopolysiloxane generally has the following Formula (III):

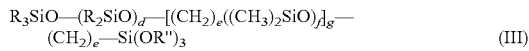

$$R_3SiO\text{—}(R_2SiO)_d\text{—}[(CH_2)_e((CH_3)_2SiO)_f]_g\text{—}(CH_2)_e\text{—}Si(OR'')_3 \quad (III)$$

where: R and R" are each independently in each occurrence as defined above; subscript "d" is the average number of (R₂SiO) units per molecule and typically has a value of 10 or more, 15 or more, 20 or more, 25 or more, even 30 or more while at the same time is generally 150 or less, 140 or less, 130 or less, 120 or less, 110 or less, 100 or less, 90 or less, 80 or less, 70 or less, 60 or less, 50 or less, 45 or less, 40 or less, 35 or less or even 30 or less; subscript "e" has a value independently in each occurrence of zero or more, one or more, even two or more and at the same time is usually 4 or less, 3 or less or even 2 or less; subscript "f" typically has a value of zero or more, one or more, 2 or more, 3 or more and at the same time is generally 6 or less, 5 or less, 4 or less, 3 or less, or even 2 or less; and subscript "g" typically has a value of zero or more, one or more, 2 or more, 3 or more, even 4 or more while at the same time generally has a value of 6 or less, even 5 or less, 4 or less, or 3 or less.

Desirably, the trialkoxysiloxy-terminated diorganopolysiloxane can have the general Formula (IV):

$$(CH_3)_3SiO\text{—}((CH_3)_2SiO)_d\text{—}Si(OR'')_3 \quad (IV)$$

One particularly desirable trialkoxysiloxy-terminated diorganopolysiloxane has the composition of Formula (IV) with R" equal to a methyl and subscript "d" equal to a value of 130 or less, preferably 120 or less, preferably 110 or less, more preferably 110 or less 100 or less, 90 or less, 80 or less, 70 or less, 60 or less, 50 or less, 40 or less, or 30 or less while at the same time 20 more, preferably 30 or more so as to form a terminal trimethoxy functionalized silicon atom.

The concentration of trialkoxy siloxy-terminated dimethylpolysiloxane is typically 1.0 wt % or more, 1.05 wt % or more or even 1.10 wt % or more while at the same time 1.20 wt % or less, 1.15 wt % or less, or even 1.10 wt % or less based on composition weight.

The composition of the present invention comprises a combination of four different sized thermally conductive filler particles: (i) large; (ii) medium; (iii) small; and (iv) very small. Determine average particle sizes for filler particles as the volume-weighted median value of particle diameter distribution (Dv50) by a laser diffraction method using a Mastersizer™ 3000 laser diffraction particle size analyzer from Malvern Instruments. The combined concentration of four different sized thermally conductive filler particles is 90 wt % or more, 92 wt % or more, 94 wt % or more, 95 wt % or more or even 96 wt % or more while at the same time is 98 wt % or less, 97 wt % or less, 96 wt % or less or even 95 wt % or less based on composition weight. Typically, the combined volume-percent (vol %) of the thermally fillers is 80 vol % or more, 81 vol % or more, 82 vol % or more, 83 vol % or more, even 84 vol % or more, while at the same time is typically 90 vol % or less, even 85 vol % or less based on composition volume.

(i) Large Particles. The large thermally conductive filler particles are one or a combination of both types of particles selected from a group selected from aluminum oxide (Al₂O₃) particles and aluminum nitride (AlN) particles. Examples of suitable large filler particles include spherical Al₂O₃ particles and crushed AlN particles. "Spherical" particles are produced by flame spray method or atomization as taught in JP201202090A. The large thermally conductive filler particles have an average particle size of 70 micrometers or more, 80 micrometers or more, 90 micrometers or more, 100 micrometers or more, 110 micrometers or more, even 120 micrometers or more, while at the same time 150 micrometers or less, 140 micrometers or less, 130 micrometers or less, 120 micrometers or less, 110 micrometers or less, 100 micrometers or less, 90 micrometers or less, or even 80 micrometers or less. The concentration of large thermally conductive filler particles in the composition is desirably 25 wt % or more, 30 wt % or more 32 wt % or more, 34 wt % or more or even 35 wt % or more while at the same time is generally 40 wt % or less, 38 wt % or less, 36 wt % or less or even 35 wt % or less based on composition weight. Examples of suitable large thermally conductive filler particles include any one or any combination of more than one selected from a group consisting of spherical Al₂O₃ having an average particle size of 70-129 micrometers and crushed AlN particles having an average particle size of 70 micrometers.

(ii) Medium Particles. The medium thermally conductive filler particles are one or a combination of both types of particles selected from a group selected from aluminum oxide (Al₂O₃) particles and aluminum nitride (AlN) particles. Examples of suitable medium thermally conductive filler particles include roundish and spherical Al₂O₃ particles and spherical AlN particles. Preferably, the medium thermally conductive filler particle is roundish or spherical Al₂O₃. "Roundish" particles are prepared by mechanical milling of crushed filler to remove edges as taught in U.S. Pat. No. 7,789,330. The medium thermally conductive filler particles have an average particle size of 30 micrometers or more or even 35 micrometers or more while at the same time 45 micrometers or less, 40 micrometers or less, or even 35 micrometers or less. The concentration of medium thermally conductive filler particles in the composition is desirably 15 wt % or more, 18 wt % or more, 19 wt or more, 20 wt % or more, 22 wt % or more, 24 wt % or more, 26 wt % or more, even 28 wt % or more while at the same time is 30 wt % or less, 29 wt % or less, 28 wt % or less, 27 wt % or less, 26 wt % or less, 25 wt % or less, 24 wt % or less, 23 wt % or less, 22 wt % or less, 21 wt % or less, or even 20 wt % or less based on composition weight. Examples of suitable medium thermally conductive filler particles include any one or any combination of more than one selected from roundish Al₂O₃ particles having an average particle size of 20-35 micrometers, spherical Al₂O₃ particles having an average particle size of 10-45 micrometers, and spherical MN particles having an average particle size of 30 micrometers.

(iii) Small Particles. The small thermally conductive filler particles are Al₂O₃ particles, preferably spherical Al₂O₃ particles. The small thermally conductive filler particles have an average particle size of one micrometer or more, 2 micrometers or more, 3 micrometers or more or even 4 micrometers or more while at the same time 5 micrometers or less, 4 micrometers or less, or even 3 micrometers or less. The concentration of small thermally conductive filler particles in the composition is desirably 25 wt % or more, 26 wt % or more, 27 wt % or more, 28 wt % or more, even 29 wt % or more while at the same time is typically 32 wt % or less, 31 wt % or less, or even 30 wt % or less based on composition weight. An example of a suitable small thermally conductive filler is spherical Al₂O₃ having an average particle size of 2 micrometers.

(iv) Very Small Particles. The very small thermally conductive filler particles are thermally conductive particles, preferably selected from one or a combination of $Al_2O_3$ and zinc oxide (ZnO). Particularly desirably very small thermally conductive filler particles are spherical $Al_2O_3$ particles and crushed ZnO particles. The very small thermally conductive filler particles have an average particle size of 0.1 micrometers or more, 0.11 micrometers or more, 0.12 micrometers or more, 0.14 micrometers or more, 0.15 micrometers or more, 0.20 micrometers or more, 0.30 micrometers or more, even 0.40 micrometers or more while at the same time is typically 0.50 micrometers or less. The concentration of very small thermally conductive filler particles in the composition is desirably 10 wt % or more, 11 wt % or more, 12 wt % or more, 13 wt % or more 14 wt % or more while at the same time is typically 15 wt % or less, 14 wt % or less, 13 wt % or less, 12 wt % or less, even 11 wt % or less based on composition weight. Examples of suitable very small thermally conductive filler particles include crushed ZnO particles having an average particle size of 0.12 micrometers and spherical $Al_2O_3$ particles having an average particle size of 0.5 micrometers.

Surprisingly, compositions of the present invention does not require MgO particles to achieve both a thermal conductivity of 7.5 W/m*K or more, even 8.0 W/m*K or more, and even 9.0 W/m*K or more—while also achieving a flow rate of greater than 50 g/min in the Extrusion Rate Test. In fact, compositions of the present invention can be free of MgO particles having an average particle size of 129 micrometers or more, even 70 micrometers or more. Compositions of the present invention can actually be free of MgO particles altogether.

The composition can optionally contain a catalyst to facilitate a reaction (such as curing) between polyorganosiloxane molecules. Catalysts include those that accelerate hydrosilylation reaction and/or those that promote moisture cure reactions. Examples of hydrosilylation catalysts include platinum based catalyst such as Speier's catalysts ($H_2PtCl_6$), Karstedt's catalyst (an organoplatinum compound derived from divinyl-containing disiloxane) and a platinum-based catalyst of 1,3-diethenyl-1,1,3,3-tetramethyldisiloxane complex encapsulate with phenyl resin as well as the rhodium-based Wilkinson's catalyst (chloridotris(triphenylphosphine)rhodium(I)). Moisture cure catalysts include any one or combination of more than one organo-metal catalysts selected from a group consisting of titanium compounds, tin compounds, and zirconium compounds. Examples of suitable titanium compounds include tetraisopropylorthotitanate, tetrabutoxyorthotitanate, di(isopropoxy)bis(ethylacetoacetate)titanium, di(isopropoxy)bis(methylacetoacetate)titanium, di(isopropoxy)bis(acetylacetonate)titanium. Examples of suitable tin compounds include dibutyltin dilaurate and dibutyltin dioctoate. Examples of suitable zirconium compounds include tetra(isopropoxy)zirconium, tetra(n-butoxy)zirconium, tetra(t-butoxy)zirconium, di(isopropoxy)bis(ethylacetoacetate)zirconium, di(isopropoxy)bis(methylacetoacetate)zirconium, and di(isopropoxy)bis(acetylacetonate)zirconium. When present, typical catalyst concentrations are 0.001 wt % or more, and can be 0.01 wt % or more, 0.10 wt % or more, 0.15 wt % or more and at the same time are generally 0.50 wt % or less, 0.40 wt % or less, 0.30 wt % or less, 0.20 wt % or less based on composition weight.

The composition can optionally contain an inhibitor. Inhibitors include curing inhibitors, known in the art for differing curing mechanisms. One example of an inhibitor is Methyhtris(1,1-dimethyl-2-propynyloxy))silane. When present, inhibitors are typically present at a concentration of 0.0001 wt % or more 0.001 wt % or more and at the same time is generally present at a concentration of 5 wt % or less, or even one wt % or less, even 0.5 wt % or less based on composition weight.

The compositions of the present invention can include (or be free of) any one or any combination of more than one additional component selected from a group consisting of antioxidant stabilizers, pigments, viscosity modifiers, fumed silica, and spacer additives. Spacers are non-thermally conductive fillers and have average particle sizes in the range of 50-250 micrometers. Examples of spacers include glass and polymer beads. Antioxidant with or without stabilizers, if present, can be included typically at a concentration of 0.001 to one wt % of the composition weight. Antioxidants can be present alone or in combination with stabilizers. Antioxidants include phenolic antioxidants and stabilizers include organophosphorous derivatives. Pigments include carbon black and other additives that introduce color to the composition. One particularly desirable pigment is copper phthalocyanine because it both can impart a blue color and it can act as a free radical scavenger. When present, pigment tends to be present at a concentration of 0.0001 to one wt % based on composition weight.

The composition of the present invention is desirably a one-part curable composition where the polyorganosiloxane component comprises a combination of vinyl capped polydiorganosiloxanes and silyl hydride functional polyorganosiloxanes, and an encapsulated platinum catalyst.

Compositions of the present invention are useful as thermally conductive materials that can be interposed along a thermal path between two objects, and an aspect of the present invention includes articles characterized by such a placement of the compositions of the present invention. For example, the composition of the present invention can be interposed between a heat generating objects and a heat sink to facilitate transfer of heat from the heat generating object to the heat sink. For example, the composition of the present invention can be interposed between a heat source component (such as central processing unit (CPU), graphics processing unit (GPU), or memory chip) and a heat dissipation component (such as a heat sink, cooling tube, cooling plate) in order to dissipate heat for the electronic devices such as data center servers, communication base stations, smartphones, optical communication modules and solid state disks.

Examples

Table 1 discloses the components used in the following samples.

Prepare samples according to the formulations set forth in Table 2. Combine the (a), (b), and (e) components in a Speed Mixer cup. Then add the (c) components from smallest to largest and mix at 1000 revolutions per minute for 20 seconds and then 1500 revolutions per minute for 20 seconds. Add the (d) component and mix further. Allow the samples to sit for 12 hours at 23 degrees Celsius (° C.) before testing. Test each sample by determining its extrusion rate (ER) in the Extrusion Rate Test and thermal conductivity (TC) in the Thermal Conductivity Test.

Extrusion Rate Test. Determine extrusion rate (ER) using Nordson EFD dispensing equipment. Package sample material into a 30 cubic centimeter syringe with a 2.54 millimeter opening (EFD syringe from Nordson Company) and dispense the sample through the opening by applying to the syringe at a pressure of 0.62 MegaPascals. The weight of the sample in grams (g) extruded after one minute (min) corresponds to the ER (g/min).

Thermal Conductivity Test. Form sample materials into two blocks having dimensions of 29 millimeters (mm) wide by 29 mm long and 8 mm thick and heat at 120° C. for 60 minutes to cure the sample material blocks in order to prepare two cured blocks of each sample. Measure thermal conductivity (TC) using Hot Disk method using a Hotdisk transient technology sensor C5501 from Hot Disk AB of Goteborg, Sweden. Use a heat time of 3-5 seconds and a power of 350-500 milliWatts. Place a planar sensor between the two cured blocks to measure TC. Use fine-tuned analysis with temperature drift compensation and time correction selected between data points 50 and 150.

Table 2 presents the formulations for the samples and the results for the ER and TC for those samples. Values for the components are wt % of that component in the formulation.

Samples 1-7 illustrate that a composition can achieve an ER value of greater than 50 g/min while also achieving a TC of greater than 7.5 W/m*K when containing a combination of the four thermally conductive fillers over a range of the presently claimed invention.

Samples 8 and 9 illustrate that when the medium sized thermally conductive filler is below 30 micrometers in average particle size then the TC drops below 7.5 W/m*K, if the particle size drops to 10 micrometer the ER also drops significantly lower than 50 g/min.

Samples 10 and 11 illustrate that when the medium sized filler is absent and the amount of large sized filler increase to 50 wt % or more of the composition, the viscosity of the composition is too high. Sample 10 is a paste and cannot be extruded. Sample 11 can be extruded, but has a low ER value.

TABLE 1

| Component | Description | Source |
|---|---|---|
| (a)1 | Dimethylvinylsiloxy-terminated dimethyl siloxane having the following average formula: $Vi(CH_3)_2SiO\text{—}((CH_3)_2SiO)_{58}\text{—}Si(CH_3)_2Vi$ | Commercially available as Gelest Product Code: DMS-V21, from Gelest |
| (a)2 | Trimethylsiloxy-terminated dimethyl siloxane-methylhydrogen siloxane having the following average formula: $(CH_3)_3SiO\text{—}((CH_3)_2SiO)_{22}\text{—}((CH_3)HSiO)_2\text{—}Si(CH_3)_3$ | Commercially available as Gelest Product Code: HMS-071 from Gelest |
| (a)3 | Trimethylsiloxy-terminated dimethyl siloxane-methylhydrogen siloxane having the following average formula: $(CH_3)_3SiO\text{—}((CH_3)_2SiO)_7\text{—}((CH_3)HSiO)_3\text{—}Si(CH_3)_3$ | Commercially available as Gelest Product Code: HMS-301, from Gelest |
| (b)1 | n-decyltrimethoxysilane | Commercially available from Sigma-Aldrich or Gelest, Inc. |
| (b)2 | Dimethylsiloxane, trimethylsiloxy-terminated; average formula: $(CH_3)_3SiO\text{—}((CH_3)_2SiO)_{30}\text{—}Si(OCH_3)_3$ | Prepare as described in US2006/0100336 |
| (c)(i)1 | Spherical $Al_2O_3$ with average particle size of 70 micrometers (μm). | Commercially available as DAW-70 from Denka Company Limited of Japan |
| (c)(i)2 | Spherical $Al_2O_3$ with average particle size of 90 micrometers (μm) | Commercially available as DAW-90 from Denka Company Limited of Japan |
| (c)(i)3 | Spherical $Al_2O_3$ with average particle size of 120 μm. | Commercially available as DAW-120 from Denka Company Limited of Japan |
| (c)(i)4 | Crushed AlN with average particle size of 70 μm. | Commercially available as AN-HF70LG-HT from Combustion Synthesis Co. Ltd. of Japan |
| (c)(ii)1 | Roundish $Al_2O_3$ with average particle size of 35 μm. | Commercially available as A-SF-60 from Zhengzhou Research Institute of Chalco of China |
| (c)(ii)2 | Spherical AlN with average particle size of 30 μm. | Commercially available as ANF S-30 from Maruwa Ceramic Co. Ltd. of Japan |
| (c)(ii)3 | Spherical $Al_2O_3$ with average particle size of 45 μm. | Commercially available as DAW-45 from Denka Company Limited of Japan |
| (c)(ii)4 | Roundish $Al_2O_3$ with average particle size of 20 μm. | Commercially available as A-SF-20 from Zhengzhou Research Institute of Chalco of China |
| (c)(ii)5 | Spherical $Al_2O_3$ with average particle size of 10 μm. | Commercially available as AZ10-75 from NIPPON STEEL Chemical & Material Co., Ltd. Micron Div. of Japan |
| (c)(iii)1 | Spherical $Al_2O_3$ with average particle size of 2 μm. | Commercially available as AZ2-75 from NIPPON STEEL Chemical & Material Co., Ltd. Micron Div. of Japan |
| (c)(iv)1 | Crushed ZnO with average particle size of 0.12 μm. | Commercially available as zocol02 from Zochem INC. from Canada |
| (c)(iv)2 | Spherical $Al_2O_3$ with average particle size of 0.50 μm. | Commercially available as ASFP-05S from Denka Company Limited of Japan |

TABLE 1-continued

| Component | Description | Source |
| --- | --- | --- |
| (d) | Platinum-based catalyst of 1,3-diethenyl-1,1,3,3-tetramethyldisiloxane complex encapsulate with phenyl resin. | (see Note 1, below) |
| (e) | Methyl(tris(1,1-dimethyl-2-propynyloxy))silane | Commercially available from Alfa Chemistry. |

Note 1:
The catalyst is a mixture containing 40 percent by weight of a complex of platinum with 1,3-divinyl-1,1,3,3-tetramethyldisiloxane dispersed in a thermoplastic silicone resin, wherein the resin has 78 mole percent monophenylsiloxane units and 22 mole percent dimethylsiloxane units and the resin has a softening point of 80-90° C.; 55 percent by weight of a dimethylvinylsiloxy-terminated polydimethylsiloxane having a viscosity of 2 Pa·s at 25° C. and a vinyl content of 0.2 percent by weight; and 5 percent by weight of a hexamethyldisilazane-treated fumed silica. The catalyst has a platinum content of 0.16 percent by weight. Such microencapsulated hydrosilylation catalysts and methods of preparing them are described in U.S. Pat. No. 4,766,176.

TABLE 2

| | Sample | | | | | | | | | | |
| --- | --- | --- | --- | --- | --- | --- | --- | --- | --- | --- | --- |
| Component/Test | 1 | 2 | 3 | 4 | 5 | 6 | 7 | 8 | 9 | 10 | 11 |
| Polyorganosiloxane | | | | | | | | | | | |
| (a)1 | 2.376 | 2.376 | 2.376 | 2.376 | 2.942 | 2.978 | 2.205 | 2.376 | 2.376 | 2.978 | 2.376 |
| (a)2 | 0.491 | 0.491 | 0.491 | 0.491 | 0.567 | 0.576 | 0.480 | 0.491 | 0.491 | 0.576 | 0.491 |
| (a)3 | 0.026 | 0.026 | 0.026 | 0.026 | 0.038 | 0.038 | 0.017 | 0.026 | 0.026 | 0.038 | 0.026 |
| Filler Treating Agent | | | | | | | | | | | |
| (b)1 | 0.219 | 0.219 | 0.219 | 0.219 | 0.236 | 0.240 | 0.218 | 0.219 | 0.219 | 0.240 | 0.219 |
| (b)2 | 1.053 | 1.053 | 1.053 | 1.053 | 1.134 | 1.151 | 1.046 | 1.053 | 1.053 | 1.151 | 1.053 |
| Thermally Conductive Filler | | | | | | | | | | | |
| Large - (c)(i)1 | | | 35.088 | | | | | | | | |
| Large - (c)(i)2 | 35.088 | | | 35.088 | | | 31.386 | 35.088 | 35.088 | | 58.772 |
| Large - (c)(i)3 | | 35.088 | | | | | | | | | |
| Large - (c)(i)4 | | | | | 33.070 | 30.700 | | | | 50.00 | |
| Medium - (c)(ii)1 | 23.684 | | | | 18.890 | | 27.899 | | | | |
| Medium - (c)(ii)2 | | | | | | 19.185 | | | | | |
| Medium - (c)(ii)3 | | 23.684 | 23.684 | 23.684 | | | | | | | |
| Medium - (c)(ii)4 | | | | | | | | | 23.684 | | |
| Medium - (c)(ii)5 | | | | | | | | 23.684 | | | |
| Small - (c)(iii)1 | 26.404 | 26.404 | 26.404 | 26.404 | 28.810 | 30.216 | 23.540 | 26.404 | 26.404 | 30.101 | 26.404 |
| V Small - (c)(iv)1 | | | | | 14.170 | 14.770 | 13.078 | | | 14.770 | |
| V Small - (c)(iv)2 | 10.526 | 10.526 | 10.526 | 10.526 | | | | 10.526 | 10.526 | | 10.526 |
| Catalyst | | | | | | | | | | | |
| (d) | 0.132 | 0.132 | 0.132 | 0.132 | 0.142 | 0.144 | 0.131 | 0.132 | 0.132 | 0.144 | 0.132 |
| Inhibitor | | | | | | | | | | | |
| (e) | 0.0011 | 0.0011 | 0.0011 | 0.0011 | 0.0013 | 0.0013 | 0.0011 | 0.0011 | 0.0011 | 0.0013 | 0.0011 |
| Test Results | | | | | | | | | | | |
| ER (g/min) | 90 | 94 | 98 | 92 | 69 | 59 | 156 | 15 | 90 | 0 | 33 |
| TC (W/m*K) | 7.7 | 7.968 | 7.962 | 7.949 | 9.205 | 10.06 | 8.371 | 6.991 | 7.385 | — | 8.582 |

What is claimed is:

1. A composition comprising:
   a. 2.5-4.0 weight-percent of a polyorganosiloxane component comprising:
      i. a trialkoxysiloxy-terminated diorganopolylsiloxane having Formula (I) where Vi refers to vinyl group, R in each occurrence is methyl and subscript a is a value in a range of 50 to 60:

$$ViR_2SiO—(R_2SiO)_a—SiR_2Vi \quad (I)$$

ii. a trimethylsiloxy-terminated dimethyl siloxane methylhydrogen siloxane having Formula (II) where b has a value in a range of 5 to 25, c has a value in a range of one to 5:

$$(CH_3)_3Si—((CH_3)_2SiO)_b—((CH_3)HSiO)_c—Si(CH_3)_3 \quad (II);$$

b. a filler treating agent comprising:
      i. 0.20-0.26 wt % of an alkyltrialkoxysilane having the general formula $(R')(R''O)_3Si$ where R' is an alkyl having 8 or more and at the same time 12 or fewer carbon atom on average per molecule and R'' is methyl; and
      ii. 0-1.2 wt % of a trialkoxysiloxy-terminated diorganopolysiloxane having the general formula $R_3SiO—(R_2SiO)_d—[(CH_2)_e((CH_3)_2SiO)_f]_g—(CH_2)_e—Si(OR'')_3$ where each R and R'' are methyl groups, d is a value in a range of 25-35, and e and g are zero;
   c. 90-98 weight-percent of a combination of thermally conductive fillers comprising:
      i. 25-40 weight-percent of thermally conductive filler particles having an average particle size of 70-120 micrometers and selected from one or a combination of aluminum oxide and aluminum nitride particles;
      ii. 15-30 weight-percent thermally conductive filler particles having an average particle size in a range of 30-45 micrometers selected from one or a combination of aluminum oxide and aluminum nitride particles;

iii. 25-32 weight-percent aluminum oxide particles having an average particle size in a range of 1-3 micrometers; and iv. 10-15 weight-percent aluminum oxide thermally conductive filler particles having an average particle size in a range of 0.1 to 0.5 micrometers;

where weight-percent is relative to composition weight.

2. The composition of claim 1, wherein the polyorganosiloxane component comprises a combination of vinyl capped polydiorganosiloxanes and silyl hydride functional polyorganosiloxanes.

3. The composition of claim 1, wherein the alkyltrialkoxysilane is an alkyltrimethoxy silane.

4. The composition of claim 1, wherein the alkyl of the alkyltrialkoxysilane is an alkyl or substituted alkyl containing 6 to 18 carbons.

5. The composition of claim 1, wherein the trialkoxysiloxy-terminated diorganopolysiloxane is a trimethoxy siloxy-terminated dimethylpolysiloxane.

6. The composition of claim 1, wherein the trialkoxysiloxy-terminated diorganopolysiloxane has the following formula:

$$R_3SiO-(R_2SiO)_d-[(CH_2)_e((CH_3)_2SiO)_f]_g-(CH_2)_e-Si(OR'')_3$$

where R is independently in each occurrence selected from hydrocarbyl groups having from one to 12 carbons; R" is a hydrocarbyl having one to 10 carbon atoms; subscript "d" has a value in a range of 10 to 150; subscript "e" has a value independently in each occurrence in a range of zero to 4; subscript "f" has a value of zero to 6 or less; and subscript "g" has a value of zero to 6.

7. The composition of claim 1, wherein thermally conductive filler (c)(iv) is one or more filler selected from a group consisting of aluminum oxide and zinc oxide particles.

8. The composition of claim 1, wherein the composition is free of magnesium oxide particle having an average particle size larger than 70 micrometers.

9. The composition of claim 1, wherein the composition is a one-part curable composition where the polyorganosiloxane component comprises a combination of vinyl capped polydiorganosiloxanes and silyl hydride functional polyorganosiloxanes, an encapsulated platinum catalyst.

10. An article of manufacture comprising the composition of claim 1 interposed along a thermal path between two objects.

* * * * *